United States Patent [19]

Ekelund

[11] Patent Number: 5,630,205
[45] Date of Patent: May 13, 1997

[54] MOBILE PHONE HAVING VOICE MESSAGE CAPABILITY

[75] Inventor: Björn Ekelund, Lund, Sweden

[73] Assignee: Ericsson Inc., Research Triangle Park, N.C.

[21] Appl. No.: 261,146

[22] Filed: Jun. 14, 1994

[51] Int. Cl.⁶ ............................................. H04B 1/00
[52] U.S. Cl. ............................................. 455/54.1; 379/58
[58] Field of Search ....................... 455/54.1, 54.2, 455/72, 89, 95, 74; 379/88, 67, 58

[56] References Cited

U.S. PATENT DOCUMENTS

| | | | |
|---|---|---|---|
| 4,312,070 | 1/1982 | Coombes et al. | 455/54.1 |
| 4,495,647 | 1/1985 | Burke et al. | 455/38 |
| 4,631,746 | 12/1986 | Bergeron et al. | 381/35 |
| 4,737,976 | 4/1988 | Borth et al. | 379/58 |
| 4,741,018 | 4/1988 | Potratz et al. | 379/58 |
| 4,769,642 | 9/1988 | Davis et al. | 340/825.44 |
| 4,905,003 | 2/1990 | Helferich | 455/68 |
| 4,942,598 | 7/1990 | Davis | 379/57 |
| 5,003,576 | 3/1991 | Helferich | 379/88 |
| 5,054,052 | 10/1991 | Nonami | 379/58 |
| 5,058,150 | 10/1991 | Kang | 379/58 |
| 5,095,503 | 3/1992 | Kowalski | 579/59 |
| 5,105,197 | 4/1992 | Clagett | 342/419 |
| 5,109,525 | 4/1992 | Nichols | 455/74 |
| 5,131,029 | 7/1992 | Kunstadt | 379/355 |
| 5,140,632 | 8/1992 | Anten | 379/447 |
| 5,155,772 | 10/1992 | Brandman et al. | 381/32 |
| 5,327,481 | 7/1994 | Horimoto | 379/58 |
| 5,375,255 | 12/1994 | Bair et al. | 455/72 |
| 5,400,393 | 3/1995 | Knuth et al. | 379/67 |
| 5,444,767 | 8/1995 | Goetcheus et al. | 379/67 |

FOREIGN PATENT DOCUMENTS

| | | |
|---|---|---|
| 542118 | 5/1993 | European Pat. Off. |
| 2254524 | 10/1992 | United Kingdom . |
| 2272346 | 5/1994 | United Kingdom . |

OTHER PUBLICATIONS

*GSM Recommendation*, Version 3.2.0, "GSM Full Rate Speech", Jan. 1991.

PCT International Search Report date of Mailing: Sep. 25, 1995.

*Primary Examiner*—Reinhard J. Eisenzopf
*Assistant Examiner*—Marsha D. Banks-Harold
*Attorney, Agent, or Firm*—Burns, Doane, Swecker & Mathis, L.L.P.

[57] ABSTRACT

A method and system for compressing and decompressing voice messages in conjunction with storage thereof. By utilizing existing compression hardware and software, additional voice message features can be provided in mobile radio units with minimal expense and system disruption.

5 Claims, 2 Drawing Sheets

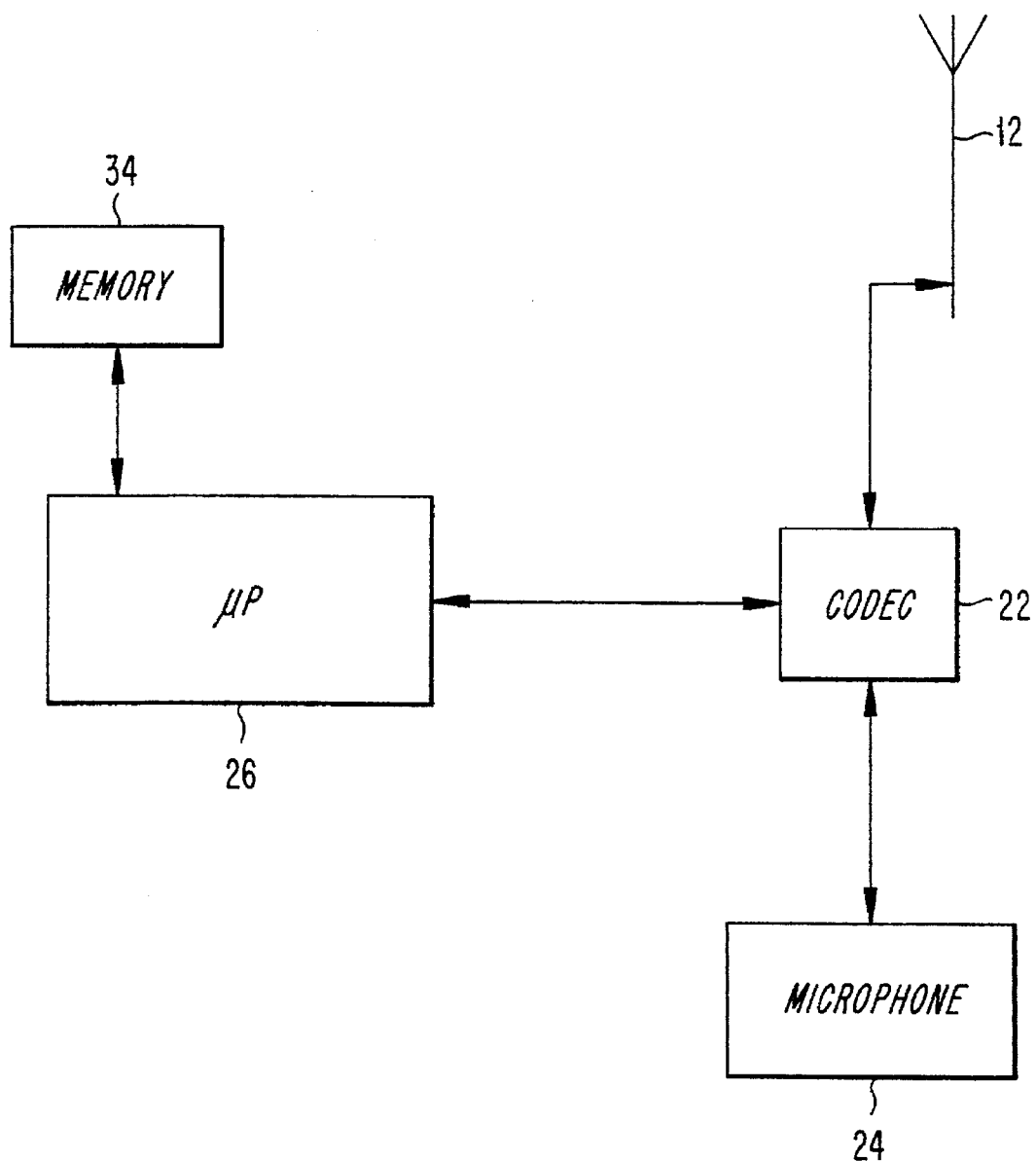

MOBILE PHONE HAVING VOICE MESSAGE CAPABILITY

BACKGROUND

The present invention generally relates to radiocommunication systems and, more particularly, to radiocommunication systems which provide for digital voice storage capability in mobile units.

The radiocommunication industry, in particular the cellular telephone industry, has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation cellular technology. Furthermore, it is widely believed that the first generation of Personal Communication Networks (PCNs), employing low cost, pocket-size, cordless telephones that can be carried comfortably and used to make or receive calls in the home, office, street, car, etc., will be provided by cellular carriers using the next generation digital cellular system infrastructure.

As users become accustomed to communicating using a portable or hand-held device, they will expect these devices to provide all of the additional features which they enjoy in more traditional, line-bound telephone systems. Thus, features such as call forwarding and conference calling are being implemented in radiocommunication systems.

Users are also accustomed to having message storage and retrieval capabilities associated with their telephone systems. This capability is provided in line-bound systems by, for example, answering machines and voice mail systems. Answering machines, which typically use electromechanical storage devices that are bulky and complex, are not very practical for portable communication devices. Voice mail type systems, which are essentially central repositories for stored messages, have been used in paging systems but are not optimal for radio communication devices which are not always connected to the system.

Because of the many drawbacks of conventional message storage and retrieval systems vis-a-vis radio communication systems, many of today's cellular systems have no message storing capability whatsoever. These systems simply play a standard message informing a caller that the person whom they are trying to reach cannot be reached at that time. This frustrates users who must then continually redial the person whom they are trying to contact.

There have been attempts in the prior art to provide message storage and retrieval capability to mobile phones in radiocommunication systems. For example, U.S. Pat. No. 4,495,647 to Burke et al. discloses a digital voice storage mobile in which a mobile unit has up to eight 64K dynamic RAMs which can store up to 42 seconds of speech. The messages are digitized using CVSD circuitry. However, this approach is problematic in that Burke et al simply digitizes the incoming and outgoing messages without data compression. Lacking data compression, this system must either provide more memory to store the desired amount of voice data or accept less voice data storage.

U.S. Pat. No. 5,003,576 to Helferich discloses an analog/digital voice storage cellular phone in which messages can be transmitted to the mobile at a high rate and replayed later by the user at a slower rate. Much like the Burke system, however, the system of Helferich simply digitizes the incoming messages and stores them in memory without data compression and, therefore, suffers from the same drawbacks as set forth above.

U.S. Pat. No. 5,105,197 to Clagett discloses a system wherein messages are stored in stationary sites and transmitted to mobile units using data compression to conserve resources, i.e., both spectrum and memory. Since the messages are not stored at the mobile unit, the user must wait until she or he is within range of the stationary site which stores her or his messages which can be very frustrating for someone who wishes to access their messages when they are not in range of the appropriate stationary site.

From the foregoing, it can be seen that the need exists for a mobile unit which can provide local voice storage using data compression, but without adding additional, expensive circuitry or changing existing standards.

SUMMARY

These and other drawbacks and difficulties found in conventional radiocommunication systems and mobile units are overcome according to the present invention. Mobile units according to exemplary embodiments of the present invention use data compression circuitry and algorithms which are already existing in mobile units in conjunction with a memory device to store and retrieve messages left by either the user or a caller. In this way, the benefits of voice storage and data compression are realized without significantly adding to the cost or size of a mobile unit.

According to exemplary embodiments of the present invention, since voice storage is more economically feasible, the mobile unit user interface can be adapted to take advantage of voice capabilities. For example, traffic safety can be enhanced by replacing displayed messages and beeps, which distract a mobile unit user from other activities, with pre-stored voice messages.

BRIEF DESCRIPTION OF THE DRAWINGS

The foregoing and other objects, features and advantages of the present invention will be more readily understood upon reading the following detailed description in conjunction with the drawings in which:

FIG. 2 is a block diagram illustrating portions of the block diagram of FIG. 1.

DETAILED DESCRIPTION

Figure 1:
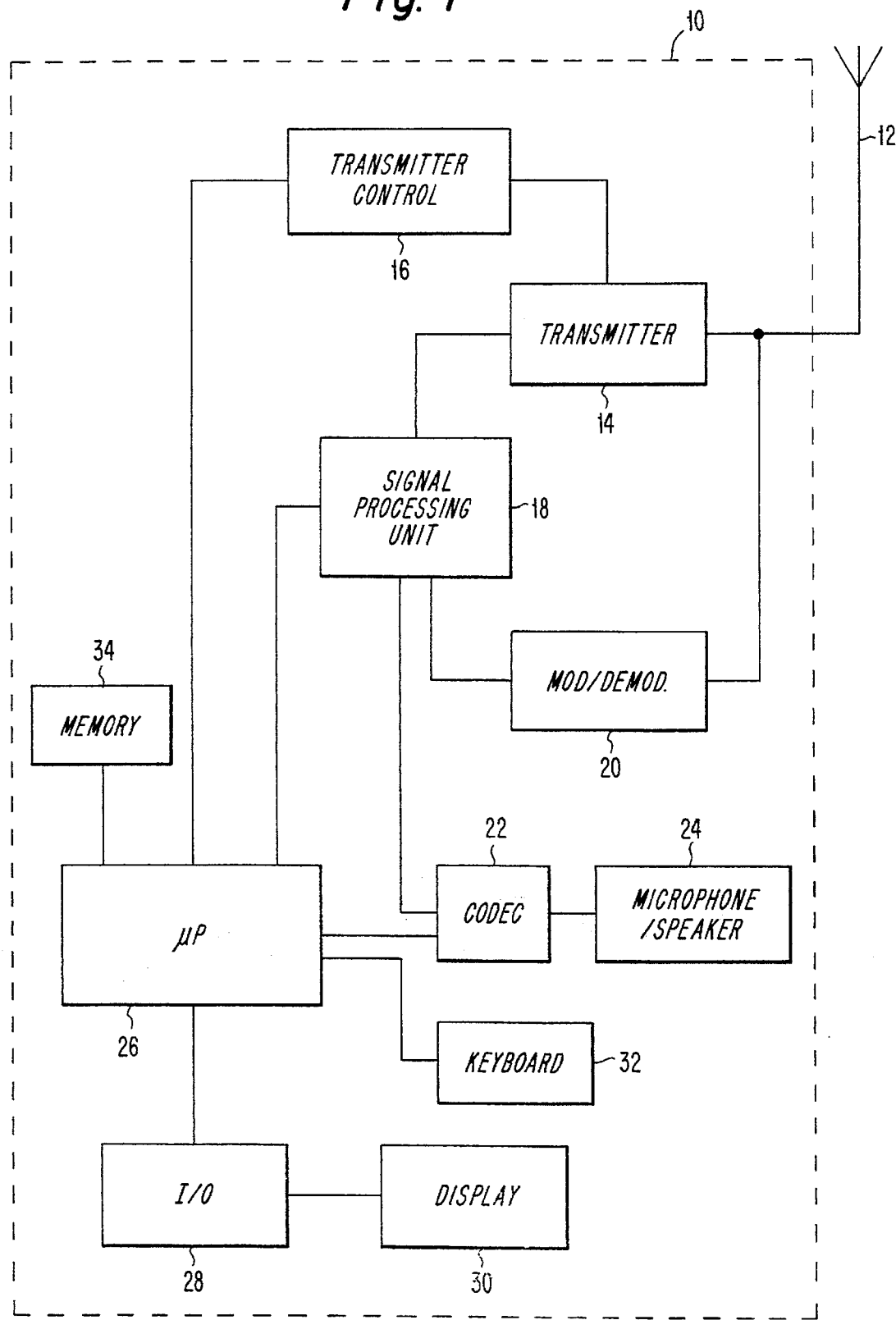
FIG. 1 is a block diagram illustrating a mobile unit according to an exemplary embodiment of the present invention.

FIG. 1 illustrates a mobile unit according to an exemplary embodiment of the present invention. This block diagram illustrates a very generalized version of a mobile unit since many of the signal processing details are conventional and are beyond the scope of the present invention. Those interested in more background information of an exemplary mobile unit are referred to U.S. Pat. No. 5,199,031, which patent is incorporated here by reference. Although this exemplary embodiment is discussed with specific reference to time division multiple access (TDMA) techniques and the GSM system, those skilled in the art will readily appreciate that the present invention can be implemented using different access techniques, e.g., code division multiple access (CDMA) and frequency division multiple access (FDMA), and in different systems, e.g., AMPS and IS-54B.

In FIG. 1, a mobile unit 10 has an antenna 12 and a transmitter 14 connected to the antenna 12 which is controlled by a transmitter control unit 16. The transmitter is also connected to a signal processing unit 18. A receiver 20 shares the antenna 12 with the transmitter 14 in time multiplex. The receiver 20 is also connected to the signal processing unit 18. Radio circuitry for modulating, demodulating and equalizing purposes is included in the blocks 14 and 20. The signal processing unit 18 includes, for example, circuitry for digitizing the incoming signal, channel coding, channel decoding and interleaving incoming and outgoing speech. The signal processing unit 18 is also connected to a coder/decoder (codec) 22, which receives speech data from, and sends speech data to, microphone/speaker 24, and to microprocessor 26. In turn, the microprocessor 26 is connected to the transmitter control unit 16 and to I/O-block 28 which processes the I/O signals to a display 30 and from a keyboard 32.

Traditional PCM techniques require on the order of 64 Kbits per second in data transfer bandwidth. Since such a high bandwidth is unsuitable for radio communications, where channel bandwidth is an expensive resource, all digital mobile phones, e.g., cellular phones, include a speech encoder for compressing/decompressing speech. To provide spectrum efficiency which is superior to analog radio communications, the data bandwidth should be on the order of 8–12 Kbps (kilobits per second). For example, in D-AMPS, a VSELP (Vector Sum Excited Linear Prediction) coding algorithm is used to provide a compressed data rate of about 8.7 Kbps. Similarly, the GSM uses an RPE-LTP (Residual Pulse Excited Long Term Prediction) coding algorithm to provide a compressed data rate of about 13 Kbps. The RPE-LTP algorithm is more fully described in GSM Recommendation 6.10 entitled "GSM Full Rate Speech Transcoding" which description is incorporated here by reference.

The codec block 22 of FIG. 1 generically symbolizes these types of speech encoders that are conventionally used in mobile radiocommunication units to compress speech received from the microphone/speaker 24 for contemporaneous transmission via antenna 12 or decompress speech data received over the air interface via antenna 12 to be output from microphone/speaker 24. Codec 22 can be designed or programmed to apply conventional compression/decompression algorithms such as those described, above.

In addition to these conventional uses for codec 22, according to exemplary embodiments of the present invention, codec 22 can also be used to compress messages to be stored in, or decompress voice messages to be output from, memory 34. Those skilled in the art will appreciate that although memory 34 is shown in FIG. 1 as a separate block, this memory space can be provided from memory devices already found in conventional mobile units or an extra memory device can be added if needed.

Rudimentary functions can be provided using codec 22 and memory 34 from which many higher level procedures can be designed, for example, (1) compressing a message received from microphone/speaker 24 and storing that message in memory 34, i.e., a greeting, (2) retrieving a message from memory 34, decompressing that message in codec 22 and outputting the message over the air interface via antenna 12, (3) compressing a message received over the air interface in codec 22 and storing that message in memory 34, and (4) retrieving a message from memory 34, decompressing that message in codec 22 and outputting the message from the microphone/speaker 24. Each of these functions will be described in more detail below with respect to FIG. 2.

In FIG. 2, those block elements which will be referred to most frequently have been reproduced from FIG. 1 using the same reference numerals, while other blocks have been omitted to clarify the description. If, for example, a user wants to initialize the message storage and retrieval capabilities of an exemplary mobile unit according to the present invention by recording a greeting to be replayed to callers when the user is not able to answer the mobile phone, he or she would depress a predetermined key combination on the keypad 32 which commands the microprocessor 26 to treat the speech data input via microphone/speaker 24 as a greeting to be stored. Codec 22 receives this data and compress the speech as it would for any speech input via microphone/speaker 24. However, instead of routing the compressed speech to the antenna 12, microprocessor 26 instructs the codec to route the compressed speech to memory 34 using, for example, a switchable output device such as a multiplexer (not shown). The microprocessor also provides suitable address information so that the compressed greeting is stored in the proper location in memory 34 for subsequent retrieval.

A caller who is attempting to contact the user of this exemplary mobile unit at a time when the user is not available to take the call will activate the message storage and retrieval system. If desired, ring counting circuitry or circuitry which determines when a predetermined time period has elapsed based on a system signalling message, can be provided to give a user the opportunity to answer before automatic answering is activated. Circuitry for counting rings and activating message storage and retrieval systems is well known in the art and, therefore, will not be further described herein. Having received the requisite number of rings without the user activating the mobile unit, the microprocessor 26 will initiate a greeting and record cycle. The greeting is retrieved from its stored location in memory 34, decompressed by codec 22 and sent to the caller over antenna 12 just as if the user had input the speech data directly from the microphone/speaker 24.

Any subsequent reply by the caller will be treated as a message to the user for storage. Microprocessor 26 will send the compressed speech data from antenna 12 to memory 34 for storage at a message storage address. Thus, this voice message bypasses the codec 22 where it would normally be decompressed and output via microphone/speaker 24. Later, when a user is able to activate his or her mobile unit, an indication will be provided that messages have been received and stored. The user can then request that the messages be replayed, such messages being decompressed by codec 22 and output over microphone/speaker 24. The message(s) stored indication could, for example, simply be a lit LED or, for more expensive units, could comprise a message stored in memory 34 that is decompressed and output when the mobile unit is activated, e.g., "You have 4 messages."

As described above, dual advantages of the present invention are the ability to compress speech messages to render message storage and retrieval economical in mobile units of radiocommunication systems and provide this ability without adding additional circuitry. As seen above, this capability can be provided according to the present invention using all or part of the speech compression algorithms already in use in conventional mobile units. Using these speech compression algorithms, two seconds of speech (approximately the duration of a simple phrase) can be stored in about 3 kbytes of memory as opposed to about 16 kbytes of memory without compression. A simpler version of this exemplary embodiment would provide only an outgoing message without the capability of storing incoming messages. Although the above-described exemplary embodiment illustrates the present invention in terms of rudimentary answering machine functions, the present invention can be implemented for any mobile unit function in which speech output to a user or caller is desirable since the present invention makes speech I/O more economical.

For example, when failing to establish a call, the mobile unit could "tell" a user that call setup has failed rather than simply beeping and printing a message on the display. In this way, a user does not have to take the transceiver away from his or her ear to find out the cause of delay or failure. The mobile unit could also inform the user of the operational status of the unit (i.e., "cell barred", "scanning for base station", "retrying", "no service", "call terminated", "low battery", etc.) using a voice message. For example, a premature disconnection of a call could be indicated to the user through a voice message rather than the sound disappearing and a handset symbol on the display going off. These messages could be prestored in fixed memory rendering implementation very inexpensive and would provide both enhanced safety and ease of use.

Similarly, although local message storage in the mobile unit provides certain advantages, some of which are described above, the present invention can also be applied to voice messages which are stored in a central location, i.e., at the land station/switch the decoding functions can be bypassed and messages stored in voice mail boxes in their compressed form. When retrieved these compressed messages can then be decompressed by codec 22. The above-described exemplary embodiments are intended to be illustrative in all respects, rather than restrictive, of the present invention. Thus the present invention is capable of many variations in detailed implementation that can be derived from the description contained herein by a person skilled in the art. For example, although the present invention has been described in terms of mobile units, those skilled in the art will appreciate that the present invention can be implemented in any radio communication device, e.g., a portable unit, PCS devices, personal digital assistants or other devices which are not used for communications but which include decompression/compression circuitry used for other purposes. All such variations and modifications are considered to be within the scope and spirit of the present invention as defined by the following claims.

What is claimed is:

1. A mobile unit of a radiocommunication system, said mobile unit comprising:
   means for transmitting outgoing radio signals,
   means for receiving and demodulating incoming radio signals,
   means for digitizing said demodulated signals,
   means for selectively decompressing said digitized signals to generate decompressed, digital signals, and
   control means for storing said digitized signals in a memory device when said digitized signals remain compressed and for outputting said decompressed, digital signals as voice data when said digitized signals have been decompressed, wherein said memory also has prestored messages and said control means retrieves a prestored message for decompression by said selective decompression means and outputs said prestored message as voice data, after the occurrence of a predetermined event associated with the prestored message, said prestored messages including at least one of:

(a) a message associated with failure to establish a call;
   (b) a message associated with premature disconnection of a call;
   (c) a message associated with cell barred status;
   (d) a message associated with scanning for a base station;
   (e) a message associated with cell retry;
   (f) a massage associated with no radiocommunication service; and
   (g) a message associated with a low battery.

2. The mobile unit of claim 1 wherein said means for selectively decompressing said digitized signals includes a codec which is operable to selectively pass said digitized signals to said memory and said decompressed, digital signals to an output device.

3. A message storage and retrieval method comprising the steps of:
   providing an encoder/decoder for compressing and decompressing digital speech data;
   compressing digital speech data received from a microphone using said encoder/decoder and storing said compressed digital speech data in a memory device;
   retrieving, after the occurrence of a predetermined event, said compressed digital speech data from said memory device, said predetermined event being one of the following events:
   (a) an event associated with failure to establish a call;
   (b) an event associated with premature disconnection of a call;
   (c) an event associated with cell barred status;
   (d) an event associated with scanning for a base station;
   (e) an event associated with cell retry;
   (f) an event associated with no radiocommunication service; and
   (g) an event associated with a low battery;
   decompressing said digital compressed speech data using said encoder/decoder; and
   transmitting, after said step of decompressing, said digital speech data via an antenna.

4. A mobile unit in a radiocommunication system comprising:
   a transmitter for transmitting outgoing radio signals;
   a receiver for receiving incoming radio signals and selectively outputting said incoming radio signals through an encoder/decoder as voice data to a speaker or storing said incoming radio signals as compressed voice data in a memory;
   a microphone for inputting voice messages, said input voice messages selectively output to either said transmitter or stored in said memory;
   said encoder/decoder for selectively compressing and decompressing said voice messages and said voice data; and
   a microprocessor for directing the voice messages and voice data to one of the memory, the speaker, and the transmitter and for determining when voice messages and voice data are to be compressed by the encoder/decoder, decompressed by the encoder/decoder and unoperated on by the encoder/decoder, wherein said memory also has prestored messages and said microprocessor retrieves a prestored message for decompression by said encoder/decoder and outputs said prestored message as voice data, after the occurrence of a predetermined event associated with the prestored message, said predetermined event being one of the following events:

(a) an event associated with failure to establish a call;
(b) an event associated with premature disconnection of a call;
(c) an event associated with cell barred status;
(d) an event associated with scanning for a base station;
(e) an event associated with cell retry;
(f) an event associated with no radiocommunication service; and
(g) an event associated with a low battery.

5. A message storage and retrieval method comprising the steps of:

providing an encoder/decoder for compressing and decompressing speech data;

compressing speech data received from microphone using said encoder/decoder;

decompressing speech data received from an antenna using said encoder/decoder;

prestoring messages in a memory;

retrieving a prestored message from said memory upon the occurrence of a predetermined event associated with said prestored message, said predetermined event being one of the following events:

(a) an event associated with failure to establish a call;
(b) an event associated with premature disconnection of a call;
(c) an event associated with cell barred status;
(d) an event associated with scanning for a base station;
(e) an event associated with cell retry;
(f) an event associated with no radiocommunication service; and
(g) an event associated with a low battery; and decompressing said prestored message using said encoder/decoder and outputting said prestored message as voice data.

* * * * *